United States Patent [19]
Ladany et al.

[11] 3,891,478

[45] June 24, 1975

[54] DEPOSITION OF EPITAXIAL LAYER FROM THE LIQUID PHASE

[75] Inventors: Ivan Ladany, Stockton; Vincent Michael Cannuli, Trenton, both of N.J.

[73] Assignee: RCA Corporation, New York, N.Y.

[22] Filed: Aug. 16, 1973

[21] Appl. No.: 388,960

[52] U.S. Cl. ................ 148/171; 148/172; 148/173; 252/62.3 GA; 117/201

[51] Int. Cl. ................................................ H01l 7/38

[58] Field of Search ............................ 148/171–173; 252/62.3 GA; 117/201

[56] References Cited

UNITED STATES PATENTS

| | | | |
|---|---|---|---|
| 3,565,702 | 2/1971 | Nelson | 148/171 |
| 3,715,245 | 2/1973 | Barnett et al. | 148/171 |
| 3,741,825 | 6/1973 | Lockwood et al. | 148/171 |
| 3,753,801 | 8/1973 | Lockwood et al. | 148/171 |
| 3,821,039 | 6/1974 | Ettenberg | 148/171 |

OTHER PUBLICATIONS

Shih et al., J. Electrochem. Soc.: Solid State Science, Vol. 118, No. 10, Oct. 1971, pp. 1631–1633.

*Primary Examiner*—G. Ozaki

*Attorney, Agent, or Firm*—G. H. Bruestle; D. S. Cohen; D. N. Calder

[57] ABSTRACT

In depositing on a substrate by liquid phase epitaxy an epitaxial layer of a semiconductor material having a volatile element, an initial epitaxial layer of the semiconductor material of the substrate is first grown by liquid phase epitaxy on the substrate to provide a smooth, undamaged surface which is not contaminated with the volatile element of the semiconductor material to be deposited. Immediately upon removal of the substrate from the solution from which the initial epitaxial layer is deposited, the substrate is placed in the solution from which the desired epitaxial layer is deposited. Thus, the desired epitaxial layer is deposited on a smooth, undamaged surface which is not contaminated with the volatile element of the semiconductor material.

5 Claims, 3 Drawing Figures

DEPOSITION OF EPITAXIAL LAYER FROM THE LIQUID PHASE

BACKGROUND OF THE INVENTION

The invention described herein was made in the performance of work under a NASA contract and is subject to the provisions of section 305 of the National Aeronautics and Space Act of 1958, Public Law 85-568 (72 Stat. 435; 42 U.S.C. 2457).

The present invention relates to a method of depositing an epitaxial layer of a semiconductor material by liquid phase epitaxy, and particularly to such a method wherein the semiconductor material contains a volatile element which is prevented from contaminating the surface on which the epitaxial layer is deposited.

Liquid phase epitaxy is particularly useful in depositing layers of the group III–V compound semiconductor materials and alloys of these materials. This technique is carried out by placing in a container a substrate and a charge of the material to be deposited and a solvent for the material. The container and its contents are then heated to a temperature at which the solvent is molten and the material dissolves in the solvent to form a solution of the material in the solvent. A surface of the substrate is then brought into contact with the solution and the container and its contents are cooled. Cooling the solution causes some of the material in the solution to precipitate out and deposit on the surface of the substrate as an epitaxial layer.

Some materials which can be deposited by liquid phase epitaxy contain an element which is volatile at the temperatures to which the materials must be heated to form the solution. This is particularly true of the alloys of the group III–V compounds which contain such volatile elements as phosphorus, and arsenic. When an epitaxial layer of such a material is deposited by liquid phase epitaxy, vapors of the volatile element are formed in the container when the material is heated to form the solution. The vapors of the volatile material tend to condense on the surface of the substrate or react with the surface of the substrate and thereby contaminate the surface of the substrate on which the epitaxial layer is to be grown. Such contaminations adversely affect good growth of the epitaxial layer on the substrate.

SUMMARY OF THE INVENTION

An epitaxial layer of a single crystalline compound or alloy having a volatile element is deposited on a substrate by bringing a surface of the substrate into contact with a first heated solution of the material of the substrate in a solvent. The first solution is cooled to deposit on the surface of the substrate an initial epitaxial layer of the material from the first solution. The substrate and the initial epitaxial layer are removed from the first solution and immediately brought into contact with a second solution of a solvent and the compound or alloy having the volatile element. The second solution is cooled to deposit on the initial epitaxial layer an epitaxial layer of the compound or alloy from the second solution. The substrate with the two epitaxial layers thereon is then removed from the second solution.

DETAILED DESCRIPTION

Figure 1:
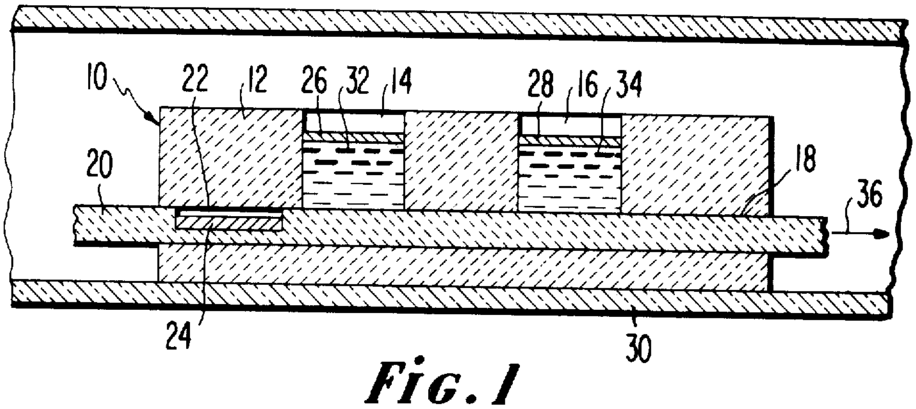
FIG. 1 is a sectional view of an apparatus suitable for carrying out the method of the present invention.

Referring to FIG. 1 of the drawing, an apparatus suitable for carrying out the method of the present invention is generally designated as 10. The apparatus 10 comprises a refractory furnace boat 12 of an inert material, such as graphite. The boat 12 has two spaced wells 14 and 16 in its upper surface. A passage 18 extends longitudinally through the boat 12 from one end to the other and extends across the bottoms of the wells 14 and 16. A slide 20 of a refractory material, such as graphite, moveably extends through the passage 18 so that the top surface of the slide forms the bottom surface of the wells 14 and 16. The slide 20 has a recess 22 in its upper surface. The recess 22 is adapted to receive a flat substrate 24 on which the epitaxial layer is to be deposited. The recess 22 is large enough to allow the substrate 24 with the upper surface of the substrate 24 being substantially parallel with the upper surface of the slide 20.

To carry out the method of the present invention, a first charge is placed in the well 14 and a second charge is placed in the well 16. The charge in the first well 14 is a mixture of the same material as that of the substrate 24 and a solvent for the material. Thus, if the substrate 24 is of single crystalline gallium arsenide, the first charge would be a mixture of gallium arsenide and a metal solvent for gallium arsenide, such as gallium. If the substrate is of a particular conductivity type, the first charge would also contain a conductivity modifier of the type contained in the substrate. The second charge in the well 16 is a mixture of the compound or alloy having the volatile element which is to be deposited on the substrate and a solvent for the compound or alloy. For example, if an epitaxial layer of indium gallium phosphide is to be deposited on the substrate, the second charge could be a mixture of gallium phosphide and indium phosphide and a metal solvent, such as indium. If the epitaxial layer to be deposited is to be of a particular conductivity type, a suitable conductivity modifier is included in the second charge.

If desired, source bodies 26 and 28 may be placed in the wells 14 and 16, respectively, over the charges in the wells. The source bodies 26 and 28 are of the same material as at least one of the materials contained in the charges. Thus, if the first charge in the well 14 contains gallium arsenide, the source body 26 would be of gallium arsenide and if the second charge in the well 16 contains gallium, indium and phosphorus, the source body 28 could be of indium phosphide.

The loaded furnace boat 12 is placed in a furnace tube 30 and a flow of high purity hydrogen is provided through the furnace tube 30 and over the furnace boat 12. Heating means (not shown) for the furnace tube are turned on to heat the contents of the furnace boat 12 to a temperature at which the solvents in the charges are molten and the other ingredients in the charges dissolve in the molten solvents. For example, if the first charge in the well 14 contains gallium arsenide and the second charge in the well contains gallium, indium and phosphorus, the furnace boat 12 and its contents are heated to a temperature of about 800°C. This temperature is maintained long enough to ensure complete melting and homogenization of the ingredients of the charges. Thus, the first charge becomes a first solution 32 of the material in the charge, such as the gallium arsenide and any conductivity modifier in the molten metal solvent, and the second charge becomes a second solution 34 of the material in the charge, such as the indium gallium phosphide, and any conductivity modifier in the molten metal solvent. By having the source bodies 26 and 28 in the wells 14 and 16, respectively, the solutions 32 and 34 will be saturated with the material by having some of the material of the source bodies dissolve in the solutions.

The slide 20 is then moved in the direction of the arrow 36 in FIG. 1, until the substrate 24 is within the well 14. This brings the surface of the substrate 24 into contact with the first solution 32. The temperature of the furnace tube 30 is then increased slightly to raise the temperature of the furnace boat 12 and its contents. This causes some of the material of the substrate 24 at its surface to melt into the first solution 32. The temperature of the furnace tube 30 is then dropped a few degrees, approximately 8° to 16°, to cool the furnace boat 12 and its contents. The cooling of the first solution 32 causes some of the material in the first solution to precipitate and deposit on the surface of the substrate 24 as an initial epitaxial layer of the same material as that of the substrate 24. This also cools the second solution 32, causing the second solution to become supersaturated with the material in the solution.

The slide 20 is then again moved in the direction of the arrow 36 to move the substrate 24 with the initial epitaxial layer thereon from the first solution 32 immediately into the well 16 where the initial epitaxial layer is brought into contact with the second solution 34. Since the second solution 34 is supersaturated, a deposit is immediately precipitated from the second solution and deposits on the initial epitaxial layer. The temperature of the furnace tube 30 is then further lowered to further cool the furnace boat 12 and its contents. The cooling of the second solution 34 causes more of the material in the second solution 34 to precipitate and deposit on the first epitaxial layer as the desired epitaxial layer of the compound or alloy containing the volatile element. When the second solution 34 has been cooled for a temperature drop which provides an epitaxial layer of the desired thickness, the slide 20 is then again moved in the direction of the arrow 36 to move the substrate 24 with the two epitaxial layers thereon out of the second solution 34. The furnace boat 12 can then be removed from the furnace tube 30 to permit removal of the substrate 24 with the two epitaxial layers thereon from the furnace boat.

Figure 2:
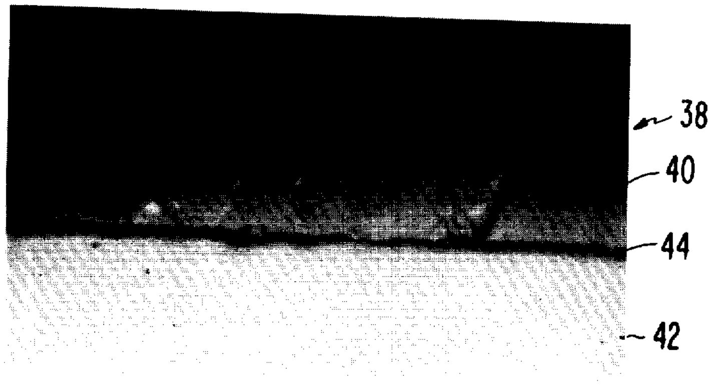
FIG. 2 is a magnified microphotograph of a section of an epitaxial layer on a substrate made by the previously used technique.

When the furnace boat 12 and its contents are heated to form the solutions 32 and 34, some of the volatile element, such as the phosphorus, in the second solution 34 will vaporize and diffuse throughout the furnace tube 30. Some of the vapors of this volatile element may condense on the surface of the substrate 24 and thereby contaminate the surface of the substrate on which the epitaxial layer of the semiconductor material containing the volatile element is to be deposited. If the desired epitaxial layer is deposited directly on this contaminated surface of the substrate 24, the junction between the epitaxial layer and the substrate will be uneven causing uneven growth of the epitaxial layer which will adversely affect the characteristics of the device being made in the epitaxial layer. For example, FIG. 2 shows a magnified microphotograph of a device 38 having an epitaxial layer 40 of indium gallium phosphide deposited directly on the surface of a gallium arsenide substrate 42, which surface is contaminated with phosphorus. As can be seen in this microphotograph, the junction 44 between the epitaxial layer 40 and the substrate 42 is very uneven.

In the method of the present invention, the surface of the substrate 24, which may be contaminated with the volatile element, is first brought into contact with a solution containing the same material as that of the substrate 24. As previously described, some of the material of the substrate 24 at the surface, including any contaminating volatile element, is melted into the first solution 32, and a thin initial epitaxial layer of the same material as that of the substrate 24 is deposited from the first solution onto the fresh surface of the substrate 24. The substrate 24 and the initial epitaxial layer are then removed from the first solution 32 and immediately placed into contact with the second solution 34 where the desired epitaxial layer of the material containing the volatile element is deposited on the initial epitaxial layer. Thus, the desired epitaxial layer of the material containing the volatile element is deposited on a freshly grown surface which is uncontaminated by any of the volatile element. This provides a smooth, flat junction between the desired epitaxial layer and the initial epitaxial layer and uniform growth of the desired epitaxial layer.

When the contaminated surface portion of the substrate 24 is melted into the first solution 32, the small amount of the contaminating volatile element mixes with the much larger amount of the material in the first solution. Thus, when the initial epitaxial layer is deposited on the substrate from the first solution, little, if any, of the contaminating volatile element in the first solution deposits out in the initial epitaxial layer. Also, the initial epitaxial layer actually becomes a part of the substrate 24 and is not a part of the active layer which is then deposited on the initial layer. Thus, a small amount of the contaminating volatile element in the initial layer does not adversely affect the electrical characteristics of the device being made.

However, if the substrate having the contaminated surface was brought directly into the second solution 34 and the contaminated surface of the substrate melted into the second solution, the contaminating volatile element would affect the ratio of the ingredients in the second solution. This could adversely affect the characteristics of the epitaxial layer deposited from the second solution. In addition, some of the materials which contain a volatile element, such as indium gallium phosphide, form a relatively viscous solution. Thus, if the contaminated surface of the substrate was melted into such a solution, the contaminating volatile element would not mix well with the solution but would remain adjacent the surface of the substrate. This would interfere with proper epitaxial deposition of the material from the solution onto the substrate. Thus, the method of the present invention provides for good epitaxial deposition of the semiconductor material containing the volatile element which is not obtainable if the contaminated substrate was brought directly into the solution containing the semiconductor material having the volatile element.

Figure 3:
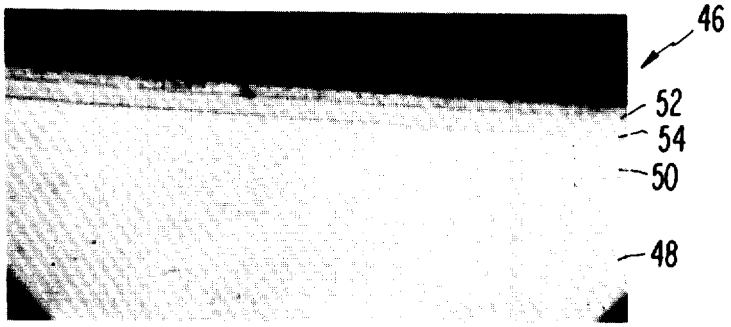
FIG. 3 is a magnified microphotograph of a section of an epitaxial layer on a substrate made by the method of the present invention.

FIG. 3 is a magnified microphotograph of a device 46 made by the method of the present invention. The device 46 comprises a substrate 48 of gallium arsenide having on a surface thereof an initial epitaxial layer 50 of gallium arsenide and an epitaxial layer 52 of indium gallium phosphide on the initial epitaxial layer 50. As can be seen, the junction 54 between the indium gallium phosphide epitaxial layer 52 and the initial gallium arsenide epitaxial layer 50 is smooth and even. This smooth, even junction between the epitaxial layer having the volatile element and the initial epitaxial layer provides an epitaxial layer of the desired material which is of more uniform thickness and of better electrical characteristics than such an epitaxial layer deposited directly on the substrate of the type shown in FIG. 2.

Thus, there is provided by the present invention a method of depositing on a substrate by liquid phase epitaxy an epitaxial layer of a material containing a volatile element to achieve an epitaxial layer of uniform thickness and good electrical characteristics.

In addition to providing a junction between the desired epitaxial layer and the material of the substrate which is smooth and flat, the method of the present invention has other advantages. When the furnace boat 12 and its contents are first cooled to deposit the initial epitaxial layer of the same material as that of the substrate, the second solution containing the material having the volatile element is also cooled so as to supersaturate the second solution. Thus, when the substrate with the initial epitaxial layer thereon is brought into contact with the second solution, and the furnace boat and its contents are further cooled, the deposition of the material from the second solution occurs rapidly to achieve good growth of the epitaxial layer of the desired material.

Another advantage of the method of the present invention is that it eliminates the need to polish the surface of the substrate. When the initial epitaxial layer of the same material as that of the substrate is deposited on the substrate, this initial epitaxial layer has a smooth, flat, damage free surface even though the surface of the substrate may not be smooth, flat, and damage free. Thus, it is not necessary to initially polish the surface of the substrate in order to achieve good epitaxial growth of the desired epitaxial layer.

We claim:

1. A method of depositing on a substrate an epitaxial layer of a single crystalline compound or alloy having a volatile element comprising the steps of depositing on a surface of said substrate from a first solution an epitaxial layer of the same material as that of the substrate by bringing the surface of the substrate into contact with the first solution, increasing the temperature of the first solution to melt some of the material of the substrate at said surface into the first solution, then cooling the first solution, and immediately upon removing the substrate and the initial epitaxial layer from the first solution, depositing on the initial epitaxial layer from a second solution an epitaxial layer of the compound or alloy having the volatile element.

2. A method in accordance with claim 1 in which both of the solutions are in a single container and the substrate with the initial epitaxial layer thereon is moved directly from the first solution into the second solution.

3. A method in accordance with claim 2 in which both solutions are formed by simultaneously heating charges of the material to be deposited from the solution and a solvent, and the substrate is in the container while the solutions are being heated.

4. A method in accordance with claim 3 in which when the first solution is cooled to deposit the initial epitaxial layer on the surface of the substrate, the second solution is simultaneously cooled to oversaturate the second solution with the material containing the volatile element.

5. A method in accordance with claim 4 in which the substrate is of a single crystalline group III–V compound, the material in the first solution is the same group III–V compound on that of the substrate, and the material in the second solution is a group II–V compound or alloy containing a volatile element.

* * * * *

UNITED STATES PATENT OFFICE
CERTIFICATE OF CORRECTION

PATENT NO. : 3,891,478

DATED : June 24, 1975

INVENTOR(S) : Ivan Ladany et al

It is certified that error appears in the above-identified patent and that said Letters Patent are hereby corrected as shown below:

Column 6 line 41 "11-V" should be -- 111-V--

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*